United States Patent
Nabeto et al.

(10) Patent No.: US 12,230,293 B2
(45) Date of Patent: Feb. 18, 2025

(54) INFORMATION PROCESSING DEVICE, CONTROL METHOD, AND RECORDING MEDIUM

(71) Applicant: NEC Corporation, Tokyo (JP)

(72) Inventors: Yu Nabeto, Tokyo (JP); Katsumi Kikuchi, Tokyo (JP); Soma Shiraishi, Tokyo (JP); Haruna Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 74 days.

(21) Appl. No.: 17/925,895

(22) PCT Filed: May 26, 2020

(86) PCT No.: PCT/JP2020/020773
§ 371 (c)(1),
(2) Date: Nov. 17, 2022

(87) PCT Pub. No.: WO2021/240653
PCT Pub. Date: Dec. 2, 2021

(65) Prior Publication Data
US 2023/0352052 A1    Nov. 2, 2023

(51) Int. Cl.
*G11B 27/00* (2006.01)
*G06V 10/70* (2022.01)
*G06V 20/40* (2022.01)

(52) U.S. Cl.
CPC ............ *G11B 27/005* (2013.01); *G06V 10/70* (2022.01); *G06V 20/49* (2022.01)

(58) Field of Classification Search
None
See application file for complete search history.

(56) References Cited

U.S. PATENT DOCUMENTS

2008/0193099 A1\* 8/2008 Nakai ............... H04N 21/4532
386/E9.041
2020/0311433 A1    10/2020 Oz et al.

FOREIGN PATENT DOCUMENTS

| JP | 2010-074323 A | 4/2010 |
| JP | 2017-199994 A | 11/2017 |
| JP | 2019-522948 A | 8/2019 |
| JP | 2019-186689 A | 10/2019 |
| WO | 2006/008923 A2 | 1/2006 |

OTHER PUBLICATIONS

International Search Report for PCT Application No. PCT/JP2020/020773, mailed on Sep. 1, 2020.

\* cited by examiner

*Primary Examiner* — Heather R Jones

(57) ABSTRACT

An information processing device 1X mainly includes a slow motion video generation means 16X and a digest candidate generation means 18X. The slow motion video generation means 16X generates a slow motion video SL being video data in which a playback speed of the first candidate video data Cd1 is slower than a normal speed, with respect to first candidate video data Cd1 being video data corresponding to a segment of a portion selected from video material data Dm. Here, the digest candidate generation means 18X generates digest candidate Cd being a candidate of a digest of the video material data Dm based on the video material data Dm and the slow motion video SL.

12 Claims, 10 Drawing Sheets

INFORMATION PROCESSING DEVICE, CONTROL METHOD, AND RECORDING MEDIUM

This application is a National Stage Entry of PCT/JP2020/020773 filed on May 26, 2020, the contents of all of which are incorporated herein by reference, in their entirety.

TECHNICAL FIELD

The present disclosure relates to an information processing device, a control method, and a recording medium for performing a process related to generating of a digest.

BACKGROUND ART

There are technologies which generate a digest by editing video data to be a material. For example, Patent Document 1 discloses a method for manufacturing the digest by confirming highlight scenes from a video stream of a sports event at the ground.

PRECEDING TECHNICAL REFERENCES

Patent Document

Patent Document 1: Japanese National Publication of International Patent Application No. 2019-522948

SUMMARY

Problem to be Solved by the Invention

Patent Document 1 does not disclose any editing of a highlight video that allows a viewer to confirm in detail important scenes in video data to be a material.

In view of the above problems, it is one object of the present disclosure to provide an information processing device, a control method, and a recording medium capable of preferably generating a digest candidate.

Means for Solving the Problem

According to an example aspect of the present disclosure, there is provided an information processing device including: a slow motion video generation means configured to generate each slow motion video being video data in which a playback speed of a first candidate video data is slower than a normal speed, with respect to the first candidate video data being video data which correspond to a segment of a portion selected from video material data; and a digest candidate generation means configured to generate a digest candidate being a candidate of a digest for the video material data based on the video material data and each slow motion video.

In another example aspect of the present disclosure, there is provided an information processing method performed by a computer, the information processing including: generating each slow motion video being video data in which a playback speed of a first candidate video data is slower than a normal speed, with respect to the first candidate video data being video data which correspond to a segment of a portion selected from video material data; and generating a digest candidate being a candidate of a digest for the video material data based on the video material data and each slow motion video.

According to still another example aspect of the present disclosure, there is provided a recording medium storing a program, the program causing a computer to perform a process including: generating each slow motion video being video data in which a playback speed of a first candidate video data is slower than a normal speed, with respect to the first candidate video data being video data which correspond to a segment of a portion selected from video material data; and generating a digest candidate being a candidate of a digest for the video material data based on the video material data and each slow motion video.

Effect of the Invention

According to the present disclosure, it becomes possible to preferably generate a digest candidate.

EXAMPLE EMBODIMENTS

In the following, example embodiments of an information processing device, a control method, and a recording medium will be described with reference to the accompanying drawings.

First Example Embodiment (1) System Configuration

Figure 1:
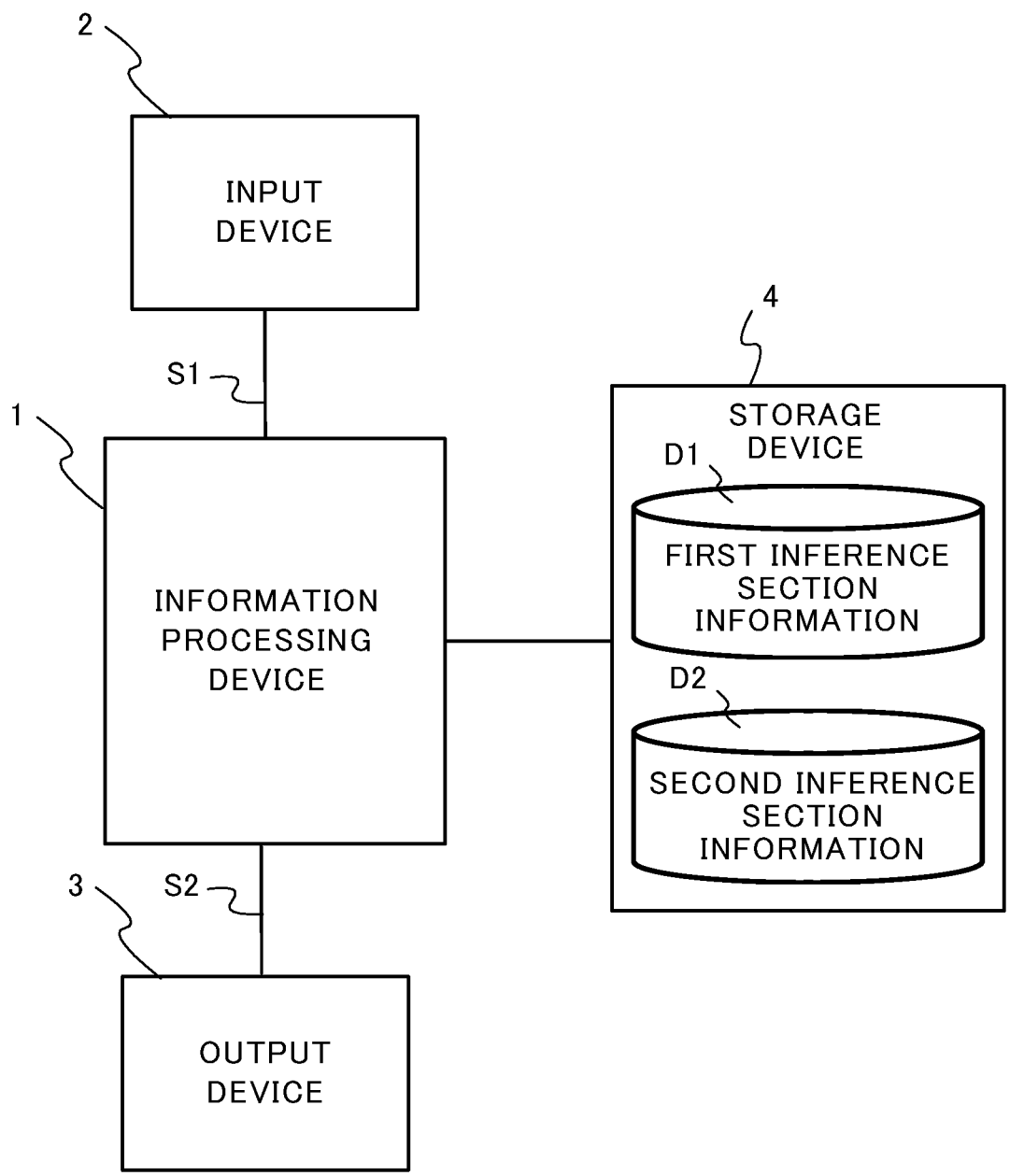
FIG. 1 illustrates a configuration of a digest candidate selection system in a first example embodiment.

FIG. 1 illustrates a configuration of a digest candidate selection system 100 according to a first example embodiment. The digest candidate selection system 100 preferably selects video data to be a candidate (also referred to as a "digest candidate Cd") for a digest of video data to be a material (also referred to as "video material data Dm"). The digest candidate selection system 100 mainly includes an information processing device 1, an input device 2, an output device 3, and a storage device 4. Hereafter, the video data may include sound data.

The information processing device 1 performs data communications with the input device 2 and the output device 3 through a communication network or by a direct wireless or wired communication. In a case where the video material data Dm are input, the information processing device 1 generates the digest candidate Cd including a slow motion video with respect to an important segment of a portion in the video material data Dm. Note that the video material data Dm may be any video data stored in the storage device 4, or may be video data supplied from an external device other than the storage device 4 to the information processing device 1. In a latter case, the video material data Dm may be video data that are transmitted in real time from a camera that generates the video data.

The input device 2 is any user interface that accepts inputs of a user, and corresponds to, for instance, a button, a keyboard, a mouse, a touch panel, a voice input device, or the like. The input device 2 supplies an input signal "S1" generated based on the inputs of the user to the information processing device 1. The output device 3 corresponds to, for instance, a display device such as a display, a projector, and a sound output device such as a speaker, and conducts a predetermined display and/or a sound output (including a playback of the digest candidate Cd) based on an output signal "S2" supplied from the information processing device 1.

The storage device 4 is a memory that stores various kinds of information items necessary for processes by the information processing device 1. The storage device 4 stores, for instance, first inference section information D1 and second inference section information D2.

The first inference section information D1 is information concerning a first inference section being an inference section that infers a first score (also referred to as a "first score Sc1") for the video data being input. The first score Sc1 is, for instance, a score indicating a degree of importance of the input video data, and the degree of importance described above indicates an index for determining whether or not the input video data correspond to an important segment or a non-important segment (that is, whether or not the input video data are suitable as a segment of the digest).

The first inference section, for instance, is trained in advance so as to infer the first score Sc1 with respect to target video data in a case where a predetermined number (more than one image) of images forming the video data are input, and the first inference section information D1 includes parameters of the trained first inference section. In the present example embodiment, the information processing device 1 sequentially inputs video data (also referred to as "segmented video data Dp") obtained by dividing the video material data Dm for each segment with a predetermined playback time length, to the first inference section. Note that the first inference section may infer the first score Sc1 with respect to sound data included in the video data as an input in addition to images forming the target video data. In this case, features calculated based on the sound data may be input to the first inference section.

The second inference section information D2 is information concerning the second inference section being an inference section that infers a second score (also called a "second score Sc2") with respect to video data being input. The second score Sc2, in a first example, indicates a score representing a probability whether a particular event occurs. The above-described "particular event" refers to an event that is important in an event to be captured, such as an occurrence of a particular action important in an event (that is, a home run in a baseball game) or an occurrence of another event (that is, an occurrence of a score in competitions that compete for scores). In a second example, the second score Sc2 indicates a score representing a similar index to the first score Sc1 and may be a degree of importance with respect to the input video data.

The second inference section, for instance, is trained in advance so as to infer the second score Sc2 for target video data in response to an input of a predetermined number of images forming video data, and the second inference section information D2 includes parameters of the trained second inference section. In the present example embodiment, the information processing device 1 sequentially inputs each of the slow motion videos generated from the segmented video data Dp being selected, to the second inference section. That is, the second inference section information D2 may include parameters of the second inference section that is classified and trained for each of playbacks speed of the video data.

Each of learning models for the first inference section and the second inference section may be a learning model based on any machine learning, such as a neural network or a support vector machine. For instance, in a case where each model for the first inference section and the second inference section described above is the neural network such as a convolutional neural network, the first inference section information D1 and the second inference section information D2 include various parameters such as a layer structure, a neuron structure for each layer, the number of filters, and a filter size at each layer, and individual weights of elements for each filter.

Note that the storage device 4 may be an external storage device such as a hard disk connected to or built in to the information processing device 1, or may be a storage medium such as a flash memory. Also, the storage device 4 may be a server device that performs data communications with the information processing device 1.

Moreover, the storage device 4 may be formed by a plurality of devices. In this case, the storage device 4 may store the first inference section information D1 and the second inference section information D2 in a distributed manner.

The configuration of the digest candidate selection system 100 described above is regarded as one example, and various changes may be made to the configuration. For instance, the input device 2 and the output device 3 may be formed integrally. In this case, the input device 2 and the output device 3 may be formed as a tablet type terminal integrated with the information processing device 1. In another example, the digest candidate selection system 100 may not include at least one of the input device 2 and the output device 3. In yet another instance, the information processing device 1 may be formed by a plurality of devices. In this case, the plurality of devices forming the information processing device 1 conduct sending and receiving of information necessary for executing a pre-allocated process among the plurality of devices.

(2) Hardware Configuration of the Information Processing Device

Figure 2:
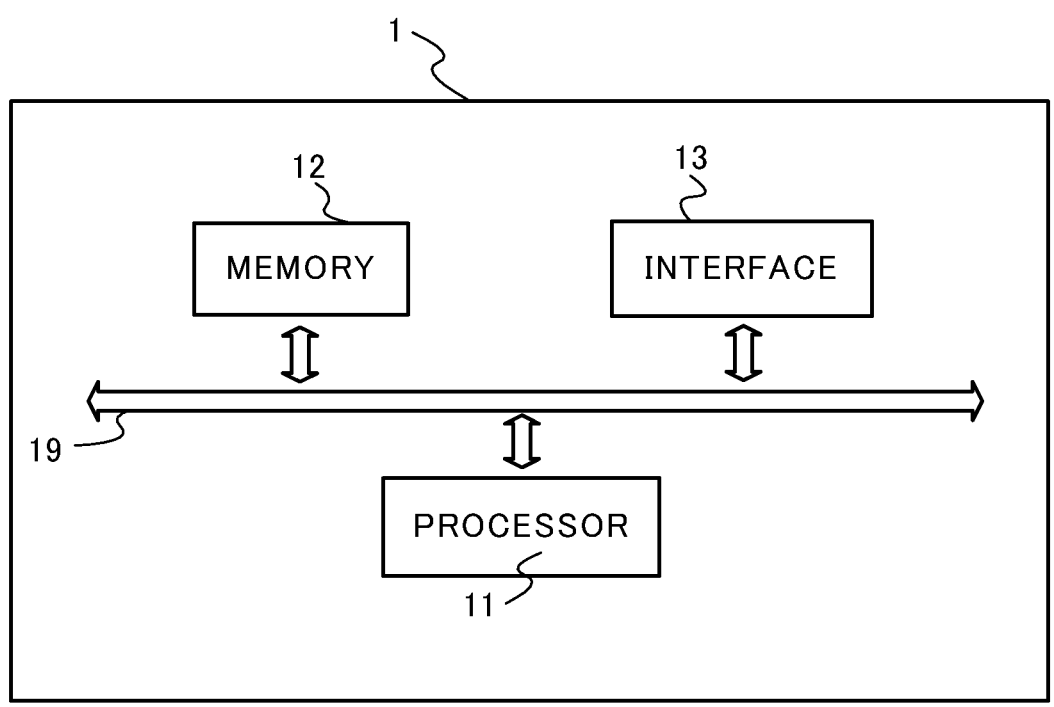
FIG. 2 illustrates a hardware configuration of an information processing device.

FIG. 2 illustrates a hardware configuration of the information processing device 1. The information processing device 1 includes a processor 11, a memory 12, and an interface 13 as hardware components. The processor 11, the memory 12, and the interface 13 are connected via a data bus 19.

The processor 11 executes a predetermined process by executing a program stored in the memory 12. The processor 11 is a processor such as a CPU (Central Processing Unit), a GPU (Graphics Processing Unit), a quantum processor, or the like.

The memory 12 is formed by various volatile and non-volatile memories such as RAM (Random Access Memory), a ROM (Read Only Memory), and the like. In addition, programs executed by the information processing device 1 are stored in the memory 12. The memory 12 is also used as a working memory and temporarily stores information acquired from the storage device 4. Incidentally, the memory 12 may function as the storage device 4. Similarly, the storage device 4 may function as the memory 12 of the information processing device 1. Noted that a program executed by the information processing device 1 may be stored in a recording medium other than the memory 12.

The interface 13 is an interface for electrically connecting the information processing device 1 and other devices. For instance, the interface 13 for connecting the information processing device 1 and other devices may be a communication interface such as a network adapter for sending and receiving data to and from other devices by a wired or wireless communication in accordance with a control of the processor 11. In another example, the information processing device 1 and other devices may be connected by a cable or the like. In this case, the interface 13 includes a hardware interface compliant with a USB (Universal Serial Bus), a SATA (Serial AT Attachment), or the like for exchanging data with other devices.

Note that the hardware configuration of the information processing device 1 is not limited to the configuration depicted in FIG. 2. For instance, the information processing device 1 may include at least one of the input device 2 and the output device 3.

(3) Functional Blocks

The information processing device 1 selects a candidate (also referred to as "first candidate video data Cd1") of the segmented video data Dp that generates the slow motion video based on the first score Sc1, and selects a candidate (also referred to as "second candidate video data Cd2") of the slow motion video to be included in the digest candidate Cd based on the second score Sc2. Next, the information processing device 1 generates the digest candidate Cd based on the first candidate video data Cd1 and the second candidate video data Cd2. In the following, a functional block of the information processing device 1 will be described for realizing the above-described processes.

Figure 3:
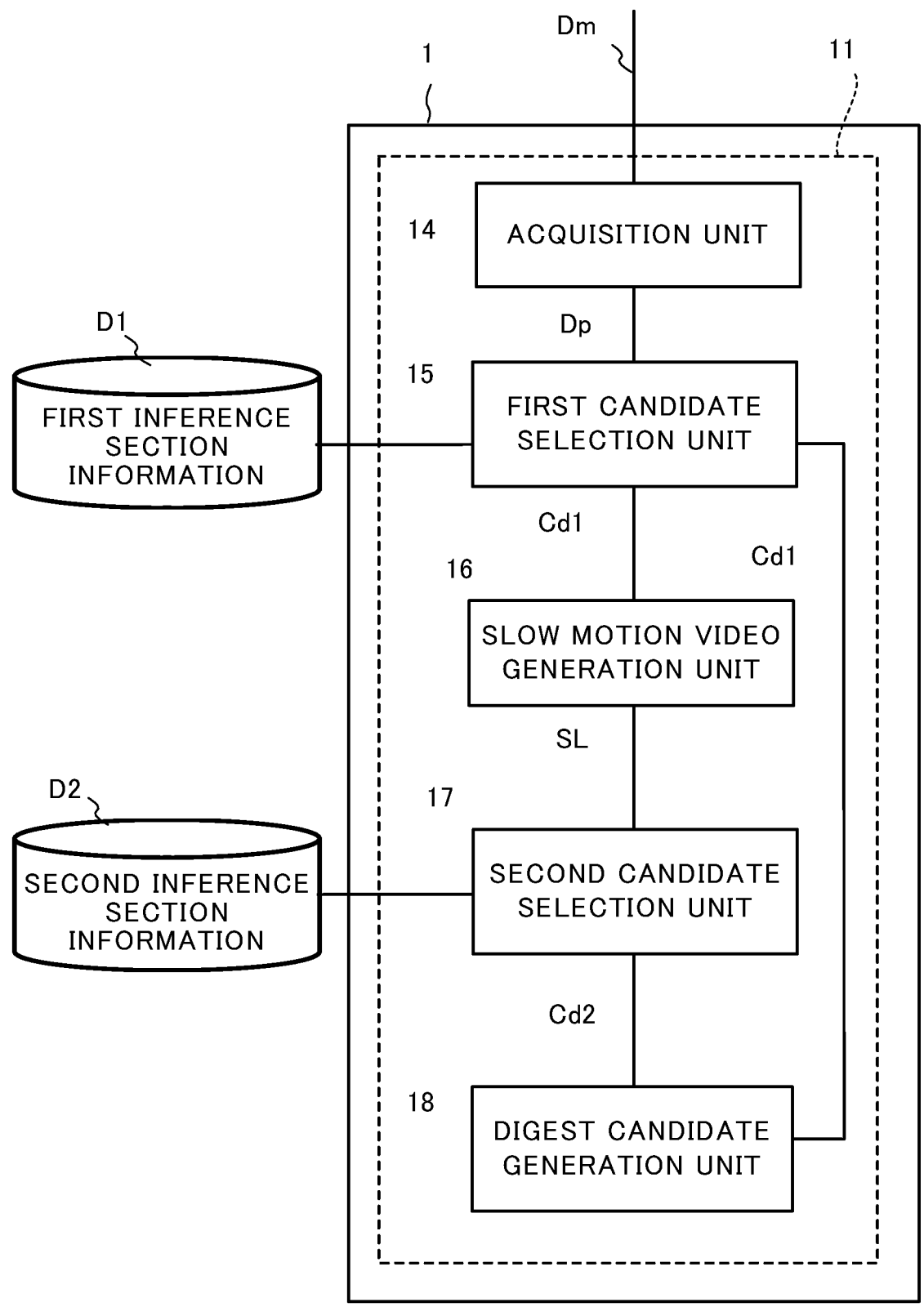
FIG. 3 illustrates an example of a functional block of the information processing device.

The processor 11 of the information processing device 1 functionally includes an acquisition unit 14, a first candidate selection unit 15, a slow motion video generation unit 16, a second candidate selection unit 17, and a digest candidate generation unit 18. Incidentally, in FIG. 3, blocks, which exchange data with each other, are mutually connected by solid lines; however, a combination of the blocks for exchanging data is not limited to as depicted in FIG. 3. A similar manner may be applied to other functional blocks, which will be described later.

The acquisition unit 14 acquires the video material data Dm via the interface 13, and sequentially supplies sets of the segmented video data Dp that are video data obtained by segmenting the video material data Dm for each segment, to the first candidate selection unit 15. In this case, the segmented video data Dp correspond to, for instance, data obtained by segmenting the video material data Dm by a segment with a unit time length, and thus are regarded as data including a predetermined number of images.

The first candidate selection unit 15 calculates the first score Sc1 with respect to the segmented video data Dp supplied from the acquisition unit 14, and selects the first candidate video data Cd1 from the segmented video data Dp based on the first score Sc1. Next, the first candidate selection unit 15 supplies the selected first candidate video data Cd1 to the slow motion video generation unit 16 and the digest candidate generation unit 18.

In this case, the first candidate selection unit 15 forms the first inference section by referring to the first inference section information D1, sequentially inputs the segmented video data Dp supplied from the acquisition unit 14 to the first inference section, and calculates the first score Sc1 for the input segmented video data Dp. Accordingly, the first candidate selection unit 15 calculates the first score Sc1 that becomes high as the segmented video data Dp with a higher degree of importance. The first candidate selection unit 15 selects, as the first candidate video data Cd1, the segmented video data Dp of which the first score Sc1 is equal to or greater than a predetermined threshold value (also referred to as a "threshold value Th1"). The first candidate video data Cd1 are regarded as a candidate of the segmented video data Dp as a subject to generate the slow motion video, as well as a candidate of the segmented video data Dp to be included in the digest candidate Cd.

Note that the first candidate selection unit 15 may regard continuous sets of the segmented video data Dp as a single collective scene in time series in a case where the sets of the segmented video data Dp, of which each first score Sc1 is equal to or greater than the threshold value Th1, form one continuous scene in time series. In this case, the first candidate video data Cd1 are formed to be video data which include at least one or more sets of the segmented video data Dp and in which a playback time length is different for each set of the segmented video data Dp.

The slow motion video generation unit 16 generates a slow motion video (also referred to as a "slow motion video SL") with a playback speed (for instance, a ½, ⅓, ¼ playback speed, or the like) which is slower than a normal speed for each of the first candidate video data Cd1 supplied from the first candidate selection unit 15. The slow motion video generation unit 16 supplies the generated slow motion video SL to the second candidate selection unit 17. In this case, for instance, the slow motion video generation unit 16 generates the slow motion video SL by inserting an interpolated image between images of the time series forming the first candidate video data Cd1, the interpolated image being generated using a predetermined number of images (frames) before and after the insertion. The interpolated image is inserted with the number of images corresponding to the playback speed and at an interval corresponding to the playback speed. The interpolated image may be generated and inserted in accordance with any one of interpolation techniques.

Preferably, the slow motion video generation unit 16 may generate respective slow motion videos SL corresponding to a plurality of playback speeds for each set of the first candidate video data Cd1. According to these generations, it is possible to include the slow motion video SL of a suitable playback speed from among the plurality of playback speeds in the digest candidate Cd.

The second candidate selection unit 17 calculates the second score Sc2 for each slow motion video SL supplied from the slow motion video generation unit 16, and selects each slow motion video SL to be the second candidate video data Cd2 based on the second score Sc2. Next, the second candidate selection unit 17 supplies the selected second candidate video data Cd2 to the digest candidate generation unit 18.

In this case, the second candidate selection unit 17 forms the second inference section by referring to the second inference section information D2, and calculates the second score Sc2 with respect to the input slow motion video SL by successively inputting the slow motion video SL to the second inference section. In this case, similar to the first score Sc1, the second score Sc2 may be a score which exhibits a higher value as a video with a higher degree of importance, and may be a score which indicates a higher value as a likelihood that a particular event has occurred is higher. Next, the second candidate selection unit 17 selects a slow motion video SL of which the second score Sc2 is equal to or greater than a predetermined threshold value (also referred to as a "threshold value Th2") as the second candidate video data Cd2. Incidentally, in a case where the parameters of the second inference section trained for each playback speed are recorded in the second inference section information D2, the second candidate selection unit 17 may select the second inference section of parameters for a playback speed of a target slow motion video SL, and may input the target slow motion video SL to the selected second inference section.

Here, a supplementary explanation will be given for a case where respective second scores Sc2 of two or more slow motion videos SL for different playback speeds generated from the same segmented video data Dp satisfy the threshold value Th2. In this case, in a first example, the second candidate selection unit 17 selects all of the two or more slow motion videos SL as the second candidate video data Cd2. In a second example, the second candidate selection unit 17 selects one slow motion video SL of which the second score Sc2 is highest among the two or more slow motion videos SL as the second candidate video data Cd2. In the second example, it is possible to preferably suppress including of a plurality of the slow motion videos SL of a similar scene in the digest candidates Cd.

Note that the slow motion video generation unit 16 and the second candidate selection unit 17 may generate the slow motion video SL and calculate the second score Sc2 for each scene in a case where a group of the segmented video data Dp forming one scene is selected as the first candidate video data Cd1. In this case, the second candidate selection unit 17 calculates the second score Sc2 for each scene (each slow motion scene) formed by successive slow motion videos SL in time series, and determines suitability as the second candidate video data Cd2 for each slow motion scene. Details of this process will be described later with reference to FIG. 4A through FIG. 4E.

The digest candidate generation unit 18 generates the digest candidate Cd based on the first candidate video data Cd1 supplied from the first candidate selection unit 15 and the second candidate video data Cd2 supplied from the second candidate selection unit 17. For instance, the digest candidate generation unit 18 generates one set of video data combining all the first candidate video data Cd1 and all the second candidate video data Cd2 as the digest candidate Cd. In this case, the digest candidate generation unit 18 generates, for instance, the digest candidate Cd in which the first candidate video data Cd1 and the second candidate video data Cd2 are connected side by side in time series for each scene. The generation of the digest candidate Cd will be described in detail later with reference to FIG. 4A through FIG. 4E.

Instead of generating one set of video data as the digest candidate Cd, the digest candidate generation unit 18 may generate a list of the first candidate video data Cd1 and the second candidate video data Cd2 as the digest candidates Cd. In this case, the digest candidate generation unit 18 may display the digest candidates Cd on the output device 3 and may accept an input of a user or the like for selecting the video data to be included in a final digest by the input device 2. Moreover, the digest candidate generation unit 18 may generate the digest candidate Cd using only portions of the selected first candidate video data Cd1 and the second candidate video data Cd2.

The digest candidate generation unit 18 may store the generated digest candidate Cd in the storage device 4 or the memory 12, and may send the generated digest candidate Cd to an external device other than the storage device 4. Moreover, the digest candidate generation unit 18 may playback the digest candidate Cd by the output device 3 by transmitting an output signal S2 for playing the digest candidate Cd to the output device 3.

Note that the components as the acquisition unit 14, the first candidate selection unit 15, the slow motion video generation unit 16, the second candidate selection unit 17, and the digest candidate generation unit 18 described with reference to FIG. 3 can be realized, for instance, by the processor 11 which executes programs stored in the storage device 4 or the memory 12. In addition, the necessary program may be recorded in any non-volatile storage medium and installed as necessary to realize each of the components. Incidentally, each of these components is not limited to being implemented by software using a program, and may be implemented by any combination of hardware, firmware, and software. Alternatively, each of these components may also be implemented using a user programmable integrated circuit such as an FPGA (field-programmable gate array), a microcomputer, or the like. In this case, the integrated circuit may be used to realize programs formed by the above-described components. Accordingly, each of the components may be implemented by any controller including hardware other than a processor. The above is the same in other example embodiments to be described later.

(4) Concrete Example

Next, a specific example for generating the digest candidate Cd based on the functional blocks depicted in FIG. 3 will be described with reference to FIG. 4A through FIG. 4E. Hereafter, as an example, it is assumed that the information processing device 1 generates, as the slow motion videos SL, a first speed slow motion video "SL1" corresponding to a first playback speed and a second speed slow motion video "SL2" corresponding to a second playback speed. Here, the first playback speed is slower than the normal speed, and the second playback speed is slower than the first playback speed.

Figure 4:
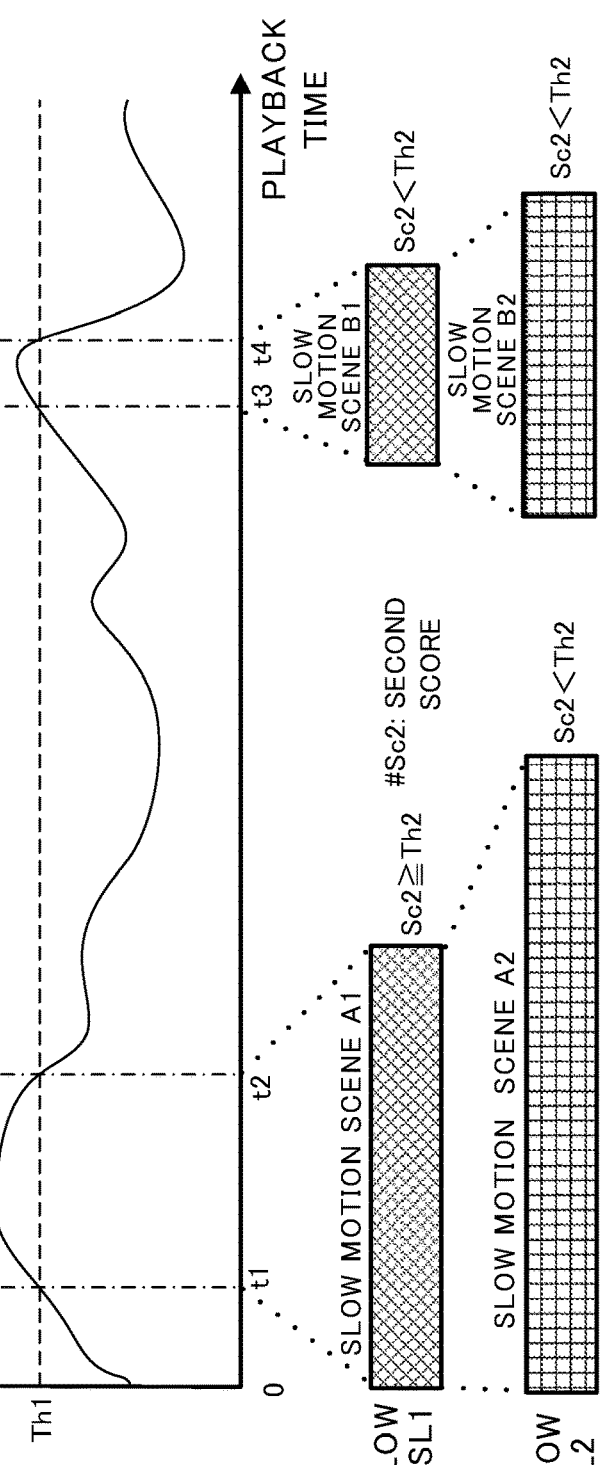
FIG. 4A is a diagram illustrating video material data by means of a bar graph which length corresponds to a playback time length of the video material data.
FIG. 4B is a diagram illustrating a line graph which represents a first score of the video material data in time series.
FIG. 4C illustrates a bar graph representing a first speed slow motion video generated from the video material data.
FIG. 4D illustrates a bar graph representing a second speed slow motion video generated from the video material data.
FIG. 4E illustrates a bar graph representing a digest candidate which is generated.

FIG. 4A is a diagram illustrating the video material data Dm by a band graph with a length corresponding to a playback time length (that is, the number of images) of the video material data Dm. FIG. 4B illustrates a line graph illustrating the first score Sc1 of the video material data Dm in time series. FIG. 4C illustrates a band graph representing the first speed slow motion video SL1 generated from the video material data Dm depicted in FIG. 4A. FIG. 4D illustrates a band graph illustrating the second speed slow motion video SL2 generated from the video material data Dm depicted in FIG. 4A. FIG. 4E illustrates a band graph representing the generated digest candidate Cd.

As illustrated in FIG. 4A and FIG. 4B, the first candidate selection unit 15 determines that each first score Sc1 of sets of the segmented video data Dp corresponding to a "scene A" and a "scene B" is equal to or greater than the threshold value Th1, and selects these sets of the segmented video data Dp as the first candidate video data. In this case, each of the scene A and the scene B corresponds to one or more sets of segmented video data Dp which are continuous and of which the first score Sc1 is equal to or greater than the threshold value Th1. Note that the scene A corresponds to a segment from a playback time "t1" to a playback time "t2" in the video material data Dm, and the scene B corresponds to a segment from a playback time "t3" to a playback time "t4" in the video material data Dm.

Next, the slow motion video generation unit 16 generates a slow motion scene "A1" in which the scene A is converted into a scene with the first playback speed and a slow motion scene "A2" in which the scene A is converted into a scene with the second playback speed. Similarly, the slow motion video generation unit 16 generates a slow motion scene "B1" in which the scene B is converted into a scene with the first playback speed and a slow motion scene "B2" in which the scene B is converted into a scene with the second playback speed. Here, the slow motion scene A1 is a scene formed from the first speed slow motion video SL1 in which the playback speed of the segmented video data Dp forming the scene A is changed to the first playback speed, and the slow motion scene B1 is a scene formed from the first speed slow motion video SL1 in which the playback speed of the segmented video data Dp forming the scene B is changed to the first playback speed. In the same manner, a slow motion scene A2 is a scene formed from the second speed slow motion video SL2 in which the playback speed of the segmented video data Dp forming the scene A is changed into the second playback speed, and a slow motion scene B2 is a scene formed from the second speed slow motion video SL2 in which the playback speed of the segmented video data Dp forming the scene B is changed into the second playback speed.

After that, the second candidate selection unit 17 calculates each of second scores Sc2 for the slow motion videos SL respectively forming the slow motion scene A1, the slow motion scene B1, the slow motion scene A2, and the slow motion scene B2, and selects, as the second candidate video data Cd2, the slow motion video SL of which the second score Sc2 is equal to or greater than the threshold value Th2. Here, the second candidate selection unit 17 determines that the second score Sc2 of the slow motion video SL corresponding to the slow motion scene A1 is equal to or greater than the threshold value Th2 and each of the second scores Sc2 of the slow motion videos SL respectively corresponding to other slow motion scenes (scenes B1, A2, and B2) is lower than the threshold value Th2. Therefore, in this case, the second candidate selection unit 17 selects the slow motion scene A1 as the second candidate video data Cd2.

Here, instead of determining suitability as the second candidate video data Cd2 for each of the slow motion videos SL respectively corresponding the slow motion scenes, the second candidate selection unit 17 may determine the suitability as the second candidate video data Cd2 for each of the slow motion scenes. In this case, the second candidate selection unit 17 calculates, as the second score Sc2 for each slow motion scene, a representative value (that is, an average value, a median value, or the like) of the second scores Sc2 respectively corresponding to slow motion videos SL being continuous for each of the slow motion scenes. Next, the second candidate selection unit 17 selects a slow motion scene in which the second score Sc2 for each slow motion scene is equal to or greater than the threshold value Th2 as the second candidate video data Cd2. In examples in FIG. 4A through FIG. 4E, the second candidate selection unit 17 calculates each second score Sc2 for the slow motion scene A1, the slow motion scene B1, the slow motion scene A2, and the slow motion scene B2, and selects the slow motion scene A1 of which the second score Sc2 is equal to or greater than the threshold value Th2 as the second candidate video data Cd2.

Next, as illustrated in FIG. 4E, the digest candidate generation unit 18 generates the digest candidate Cd in which the scene A and the scene B being the first candidate video data Cd1 and the slow motion scene A1 being the second candidate video data Cd2 are connected in time series.

Here, for the scene to be the same segment (the same playback time period) in the video material data Dm, the digest candidate generation unit 18 connects scenes in an order from the scene of which the playback speed is closer to the normal speed. In an example in FIG. 4E, since the scene A and the slow motion scene A1 correspond to the same segment in the video material data Dm, the digest candidate generation unit 18 generates the digest candidate Cd in which the scene A of which the playback speed is equal to the normal speed is arranged prior to the slow motion scene A1.

Moreover, the digest candidate generation unit 18 incorporates continuous video data with a constant playback speed into the digest candidate Cd as a single collective scene. In the example in FIG. 4E, since each of the scene A, the slow motion scene A1, and the scene B corresponds to a series of video data being continuous with the constant playback speed, the digest candidate generation unit 18 incorporates each of these scenes into the digest candidate Cd as one collective scene. Accordingly, it is possible for the digest candidate generation unit 18 to preferably suppress generating of the digest candidate Cd in which the slow motion video is inserted by a disorganized and unnatural interval.

(5) Training of the First Inference Section and the Second Inference Section

Figure 5:
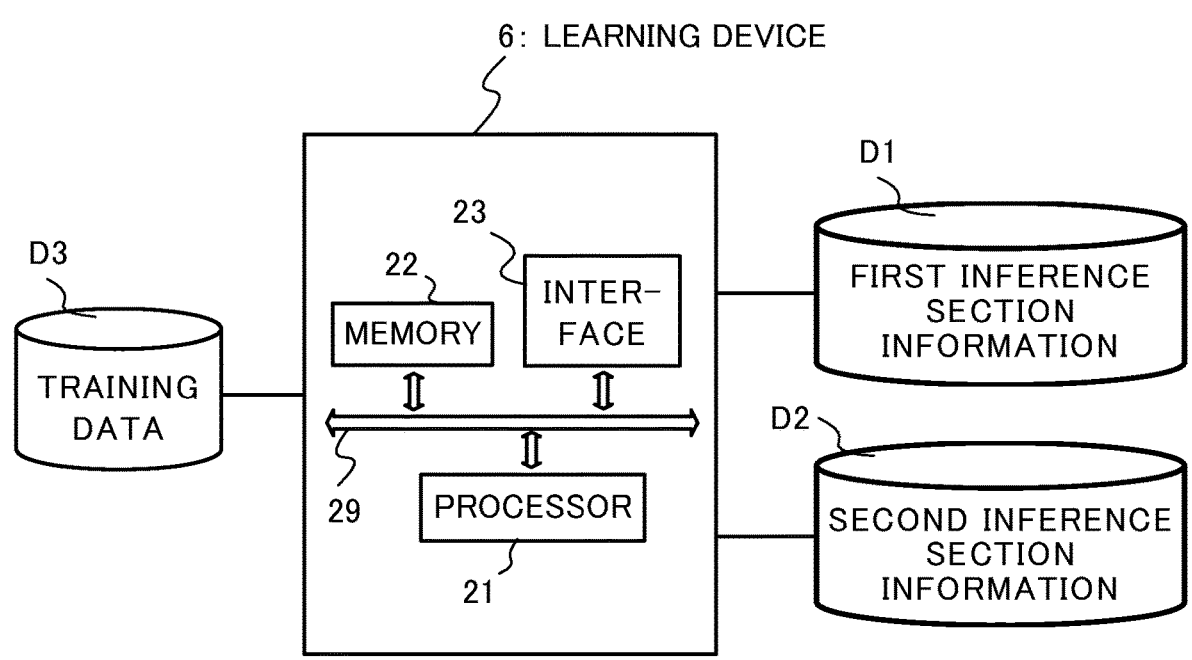
FIG. 5 illustrates an example of a functional block configuration of a learning device.

Next, generations of the first inference section information D1 and the second inference section information D2 by training the first inference section and the second inference section will be described. FIG. 5 is a schematic configuration diagram of a learning system for training the first inference section and the second inference section. The learning system includes a learning device 6 which can refer to training data D3.

The learning device 6 includes the same configuration as that of the information processing device 1 illustrated in FIG. 2, for instance, and mainly includes a processor 21, a memory 22, and an interface 23. The learning device 6 may act as the information processing device 1, and may be any device other than the information processing device 1.

The training data D3 includes training material data which are material data for training, a first label which corresponds to a correct answer label concerning the first score Sc1 with respect to the training material data, and a second label which corresponds to a correct answer label concerning the second score Sc2 with respect to the training material data.

The first label indicates, for instance, information for discriminating between the important segment and the non-important segment in the training material data. The second label indicates, for instance, information for identifying an occurrence segment of a particular event in the training material data. In another example, similar to the first label, the second label may indicate information for discriminating between the important segment and the non-important segment in the training material data.

The training material data are not limited to video data of the normal speed, and may include video data of a plurality of playback speeds slower than the normal speed. Moreover, the training material data may be provided for training of the first inference section and for training of the second inference section, respectively. In this case, as the training material data of the first inference section, a set of video data of the normal speed with the first label attached is provided. Moreover, as the training material data of the second inference section, sets of video data corresponding to a plurality of playback speeds slower than the normal speed with the second label attached are provided.

Next, the learning device 6 refers to the training data D3 and performs the training of the first inference section based on the training material data and the first label. In this case, the learning device 6 determines parameters of the first inference section so that an error (a loss) between an output of the first inference section in a case of inputting the segmented video data extracted from the training material data into the first inference section and the first score Sc1 of a correct answer indicated by the first label corresponding to the input data is minimized. An algorithm for determining the parameters described above to minimize the loss may be any learning algorithm used in machine learning such as a gradient descent method, an error back-propagation method, or the like. Note that the learning device 6 may set the first score Sc1 of the correct answer as a maximum value of the first score Sc1 for the segmented video data of the training material data designated as the important segment by the first label, and may set the first score Sc1 of the correct answer as a minimum value of the first score Sc1 for other sets of the segmented video data.

In the same manner, the learning device 6 refers to the training data D3 and performs the training of the second inference section based on the training material data and the second label. In this case, the learning device 6 determines the parameters of the second inference section so that an error (a loss) between an output of the second inference section in a case of inputting the segmented video data extracted from the training material data into the second inference section and the second score Sc2 of the correct answer indicated by the second label corresponding to the input data is minimized.

After that, the learning device 6 generates parameters of the first inference section obtained by training as the first inference section information D1, and generates parameters of the second inference section obtained by training as the second inference section information D2. Note that the first inference section information D1 and the second inference section information D2 which are generated may be immediately stored in the storage device 4 through data communication between the storage device 4 and the learning device 6, or may be stored in the storage device 4 through a removable storage medium.

Note that the training of the first inference section and the second inference section may be performed by separate devices, respectively. In this case, the learning device 6 is formed by a plurality of devices respectively performing the training of the first inference section and the training of the second inference section. Moreover, the first inference section and the second inference section may be trained for different types of events to be taken for the training material data.

(6) Process Flow

Figure 6:
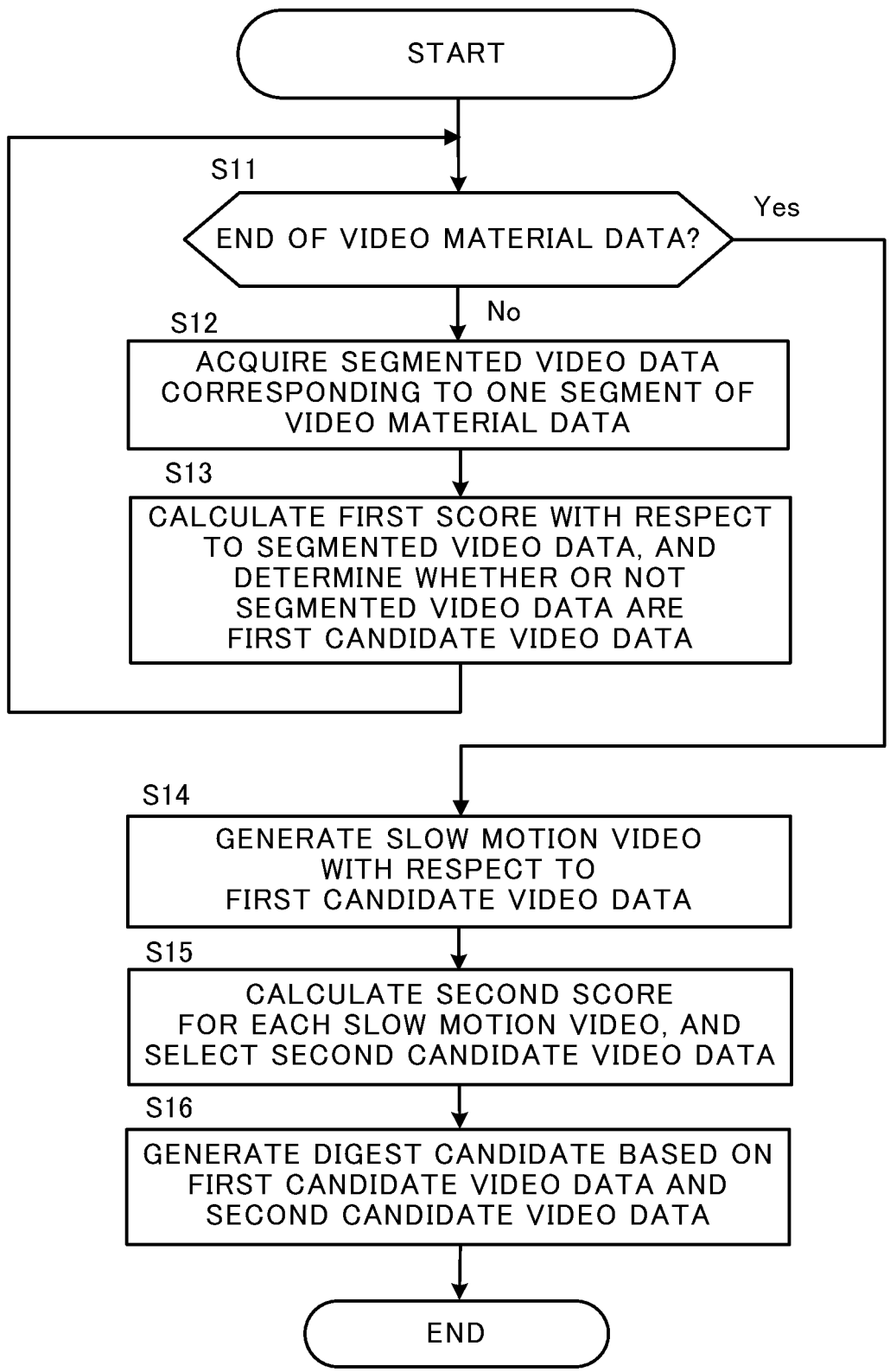
FIG. 6 illustrates an example of a flowchart for explaining steps in a process executed by the information processing device in the first example embodiment.

FIG. 6 is an example of a flowchart illustrating steps of a process performed by the information processing device 1 in the first example embodiment. The information processing device 1 executes the process represented in the flowchart illustrated in FIG. 6, for instance, when detecting an input of a user to instruct a start of the process by indicating the video material data Dm as a subject, when a supply of the video material data Dm is started from an external device.

First, the information processing device 1 determines whether or not it is an end of the video material data Dm (step S11). In this case, the information processing device 1 determines the end of the video material data Dm when processes of step S12 and step S13 to be described later are completed with respect to all segments of the video material data Dm being a subject. Next, the information processing device 1 advances to step S14 when it is the end of the video material data Dm (step S11; Yes). On the other hand, when it is not the end of the video material data Dm (step S11; No), the information processing device 1 executes processes of step S12 and step S13 for the segmented video data Dp of the material image data in which the processes of step S12 and step S13 have not been performed.

In step S12, the acquisition unit 14 of the information processing device 1 acquires the segmented video data Dp corresponding to one segment of the video material data Dm (step S12). For instance, the acquisition unit 14 acquires the segmented video data Dp of the video material data Dm in which the processes of step S12 and step S13 have not been performed, in an order of earlier playback time. In this case, the acquisition unit 14 acquires the segmented video data Dp from the memory 12, or from the storage device 4 or other external device via the interface 13.

Next, the first candidate selection unit 15 calculates the first score Sc1 with respect to the segmented video data Dp acquired in step S12, and determines whether or not the segmented video data Dp are the first candidate video data Cd1 (step S13). In this case, the first candidate selection unit 15 regards that the segmented video data Dp are the first candidate video data Cd1 when the first score Sc1, which is calculated by inputting the segmented video data Dp to the first inference section formed with reference to the first inference section information D1, is equal to or greater than the threshold value Th1. On the other hand, the first candidate selection unit 15 regards that the segmented video data Dp are not the first candidate video data Cd1 when the first score Th1 of the segmented video data Dp is lower than the threshold value Th1. After that, the information processing device 1 returns to step S11, repeats step S12 and step S13 until the end of the video material data Dm, and determines whether or not all sets of segmented video data Dp forming the video material data Dm are suitable with respect to the first candidate video data Cd1.

In step S14, the slow motion video generation unit 16 generates the slow motion video SL in which the playback speed is converted into a speed slower than a normal speed with respect to the first candidate video data Cd1 selected in step S13 (step S14). In this case, preferably, the slow motion video generation unit 16 may generate the slow motion videos SL for a plurality of predetermined playback speeds for each set of the first candidate video data Cd1.

Subsequently, the second candidate selection unit 17 calculates the second score Sc2 for each of the slow motion videos SL, and selects the second candidate video data Cd2 among the slow motion videos SL (step S15). In this case, for instance, the second candidate selection unit 17 calculates each second score Sc2 by inputting the slow motion videos SL to the second inference section, which is formed by referring to the second inference section information D2, and selects each slow motion video SL of which the second score Sc2 is equal to or greater than the threshold value Th2, as the second candidate video data Cd2. Note that the second candidate selection unit 17 may select only the slow motion video SL having the highest second score Sc2 as the second candidate video data Cd2 in a case where the second scores Sc2 of a plurality of slow motion videos SL respectively corresponding to segments in the same video material data Dm are equal to or greater than the threshold value Th2. Also, as described with reference to the concrete examples in FIG. 4A through FIG. 4E, the second candidate selection unit 17 may select the second candidate video data Cd2 for each of slow motion scenes in which the slow motion videos SL with the same playback speed are continuous in time series.

After that, the digest candidate generation unit 18 generates the digest candidate Cd based on the first candidate video data Cd1 selected in step S13 and the second candidate video data Cd2 selected in step S15 (step S16). In this case, for instance, the digest candidate generation unit 18 generates, as the digest candidate Cd, the video data obtained by connecting the first candidate video data Cd1 and the second candidate video data Cd2 in time series. In another example, the digest candidate generation unit 18 generates, as the digest candidate Cd, a list of the first candidate video data Cd1 and the second candidate video data Cd2.

Here, a supplementary description will be given of advantages according to the present example embodiment.

A need for automatic editing of sports videos has been increased due to two needs of reducing an editing time of a sports video and of expanding contents. In sports games, the digest video generally includes a slow motion video. However, in a case where a digest is automatically generated by simply extracting and combining important scenes from a video of the camera based on a degree of importance, the automatically generated digest does not include the slow motion video.

In view of the above, in the first example embodiment, the information processing device 1 generates each slow motion video SL for each segment of which the first score Sc1 is equal to or greater than the threshold value Th1, and further uses, as the digest candidate Cd, each slow motion video SL of which the second score Sc2 is equal to or greater than the threshold value Th2. According to the first example embodiment, it becomes possible to preferably generate a digest containing a slow motion video. For instance, it is also possible to preferably generate a digest including a slow motion video of a scene in which a foul throw or a goal is judged, from the video material data Dm recording a game of soccer.

(7) Modifications

Next, each of modifications preferable for the above example embodiment will be described. The following modifications may be combined arbitrarily and applied to the above-described example embodiment.

(Modification 1)

The first inference section and the second inference section may be similar inference sections formed by using similar parameters.

In this case, in the storage device 4, parameters of an inference section that functions as both the first inference section and the second inference section are stored, and the information processing device 1 calculates the first score Sc1 and the second score Sc2 based on the inference section, which is formed by referring to the parameters. In this case, the above-described inference section is regarded as, for instance, an inference section that has been trained to infer a score corresponding to a degree of importance with respect to video data being input, similar to the first inference section. Even in this aspect, similarly to the above-described example embodiment, it is possible for the information processing device 1 to preferably perform selecting of each segment of the video material data Dm that generates the slow motion video SL, and selecting of the slow motion video SL to be included in the digest candidate Cd.

(Modification 2)

The digest candidate generation unit 18 may include, in the digest candidate Cd, only one of the first candidate video data Cd1 and the second candidate video data Cd2 corresponding to the same segment in the video material data Dm.

For instance, in the examples of FIG. 4A through FIG. 4E, the scene A and the slow motion scene A1 correspond to the same segment (that is, the segment from the time t1 to the time t2) in the video material data Dm. In this case, the digest candidate generation unit 18 selects either one of the scene A and the slow motion scene A1 as a scene to be included in the digest candidate Cd. For instance, the digest candidate generation unit 18 compares the first score Sc1 for the scene A with the second score Sc2 for the slow motion scene A1, and selects a scene corresponding to a higher score as a scene to be included in the digest candidate Cd. In this case, the first score Sc1 and the second score Sc2 may be scores being the same comparable indices (that is, scores indicating the degree of importance).

According to the present modification, it is possible for the information processing device 1 to prevent a plurality of videos of which only the playback speeds differ from each other, from being included in the digest candidate Cd, and it is thus possible to preferably suppress a redundancy of the digest candidate Cd.

(Modification 3)

The information processing device 1 may generate the digest candidate Cd based on the video material data Dm to which a label for identifying whether or not each segment is an important segment is provided in advance. In this case, instead of selecting the first candidate video data Cd1 by referring to the first inference section information D1, the information processing device 1 selects the first candidate video data Cd1 by referring to the label described above.

Figure 7:
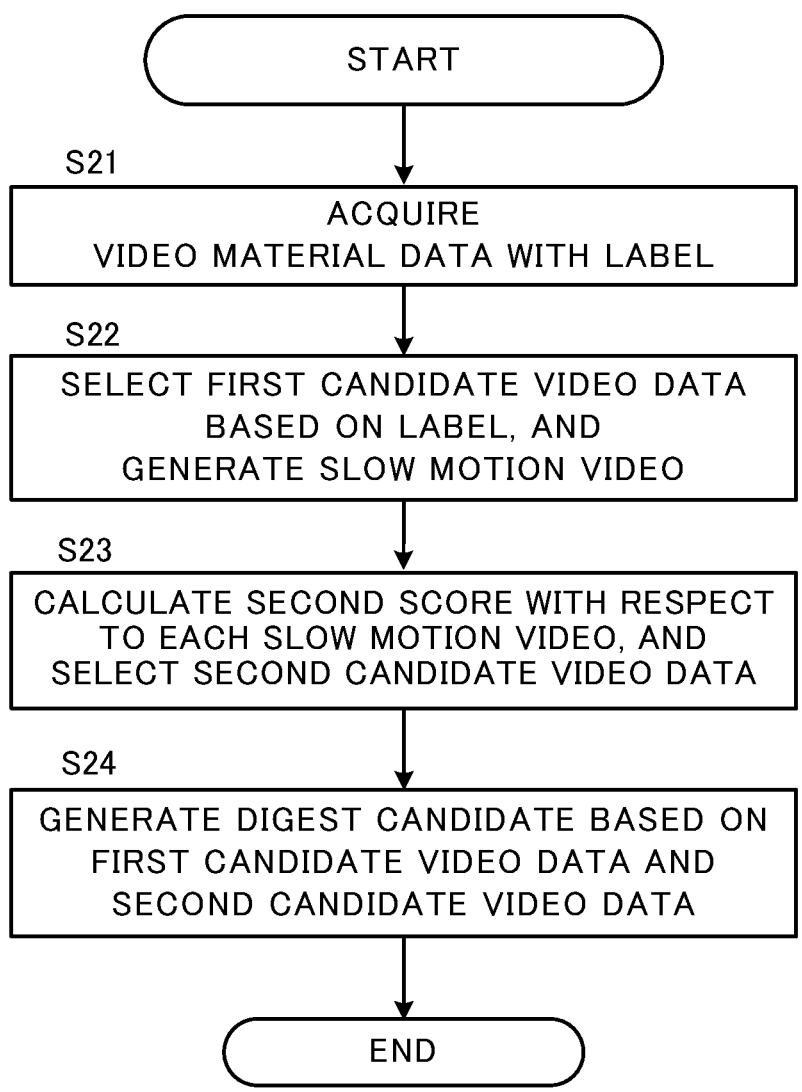
FIG. 7 illustrates an example of a flowchart for explaining steps in a process executed by the information processing device in Modification 3.

FIG. 7 illustrates an example of a flowchart for a process executed by the information processing device 1 in Modification 3. First, the acquisition unit 14 of the information processing device 1 acquires the video material data Dm to which a label for identifying whether or not a segment is an important segment is provided (step S21). In this case, the acquisition unit 14 may acquire the video material data Dm from the memory 12 or may acquire the video material data Dm from the storage device 4 or another external device.

Next, the first candidate selection unit 15 regards the important segment identified based on the label provided to the video material data Dm as the first candidate video data Cd1, and the slow motion video generation unit 16 generates the slow motion video SL for the first candidate video data Cd1 (step S22). Subsequently, the second candidate selection unit 17 calculates the second score Sc2 for each slow motion video SL, and selects the second candidate video data Cd2 (step S23). In this case, similar to step S15 in FIG. 6, the second candidate video data Cd2 are selected based on the second score Sc2 calculated by inputting each slow motion video SL to the second inference section, which is formed by referring to the second inference section information D2. After that, similar to step S16 in FIG. 6, the digest candidate generation unit 18 generates the digest candidate Cd based on the first candidate video data Cd1 and the second candidate video data Cd2 (step S24).

As described above, even in this modification, the information processing device 1 can preferably generate the digest candidate Cd including the slow motion video SL. Moreover, in the present modification, the information processing device 1 can generate the digest candidate Cd without using the first inference section information D1.

(Modification 4)

The information processing device 1 may separately select a set of the segmented video data Dp as a subject to generate the slow motion video SL and a set of the segmented video data Dp as a subject to be included in the digest candidate Cd. Hereafter, the segmented video data Dp for which the slow motion video SL is to be generated will be referred to as the first candidate video data Cd1, and the segmented video data Dp to be included in the digest candidate Cd are also called "third candidate video data Cd3".

Figure 8:
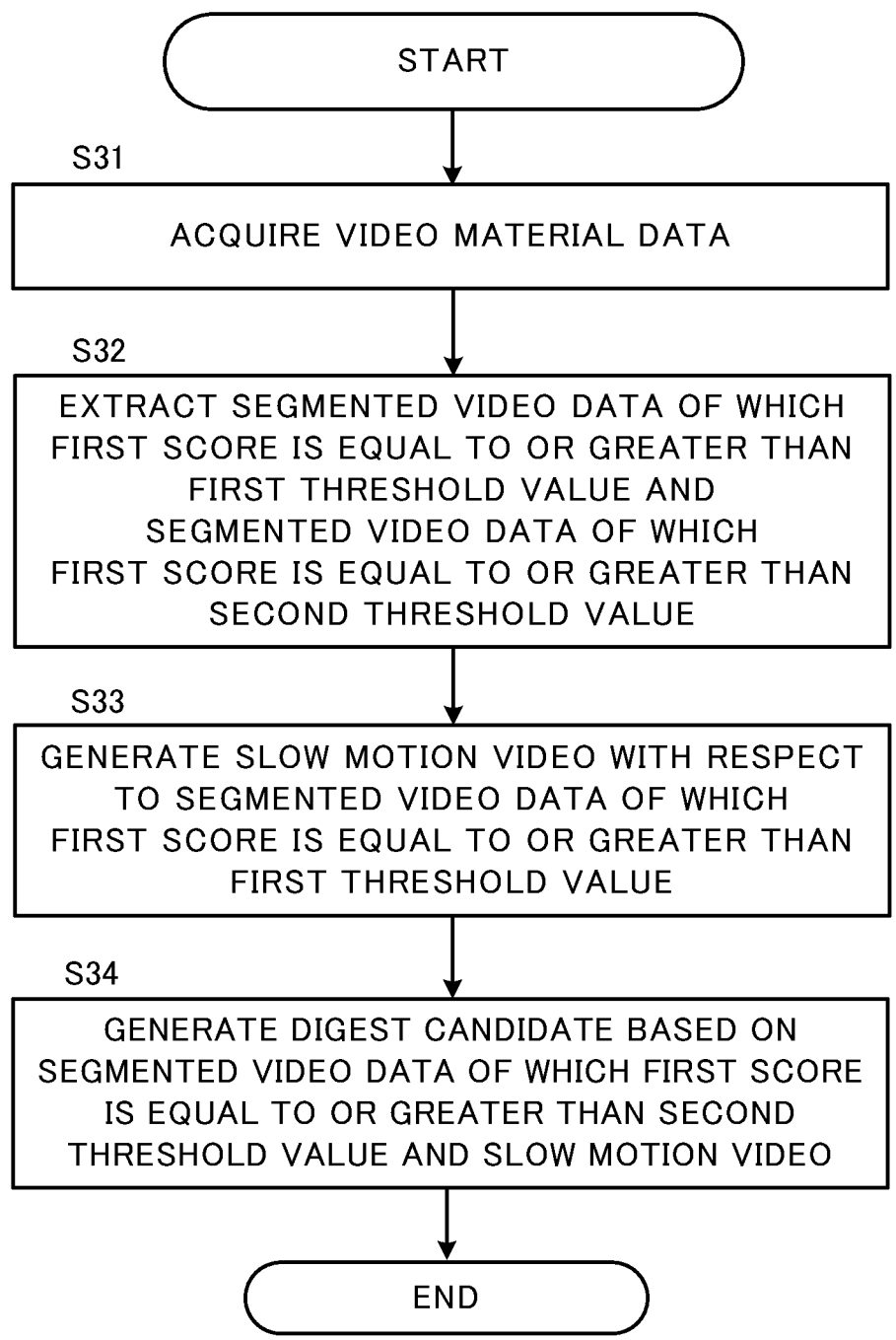
FIG. 8 illustrates an example of a flowchart for explaining steps in a process executed by the information processing device in Modification 4.

FIG. 8 is an example of a flowchart for a process executed by the information processing device 1 in Modification 4. In this example, the information processing device 1 determines the first candidate video data Cd1 and third candidate video data Cd3 using different threshold values with respect to the first score Sc1. Thereafter, a threshold value of the first score Sc1 for determining the first candidate video data Cd1 is referred to as a "first threshold value Th11", and a threshold value of the first score Sc1 for determining the third candidate video data Cd3 is referred to as a "second threshold value Th12". The first threshold value Th11 is set to a value higher than the second threshold value Th12.

First, the acquisition unit 14 of the information processing device 1 acquires the video material data Dm (step S31). Next, the first candidate selection unit 15 extracts a set of the segmented video data Dp of which the first score Sc1 is equal to or greater than the first threshold value Th11, and another set of the segmented video data Dp of which the first score Sc1 is equal to or greater than the second threshold value Th12 (step S32). In this case, the first candidate selection unit 15 selects the segmented video data Dp of which the first score Sc1 is equal to or greater than the first threshold value Th11 as the first candidate video data Cd1, and selects the segmented video data Dp of which the first score Sc1 is equal to or greater than the second threshold value Th12 as the third candidate video data Cd3. Here, since the first threshold value Th11 is higher than the second threshold value Th12, the segmented video data Dp of which the first score Sc1 is higher among the third candidate video data Cd3 are selected as the first candidate video data Cd1.

Next, the slow motion video generation unit 16 generates a slow motion video SL for the first candidate video data Cd1 regarded as the segmented video data Dp of which the first score Sc1 is equal to or higher than the first threshold value Th11 (step S33). Next, the digest candidate generation unit 18 generates a digest candidate Cd based on the third candidate video data Cd3 regarded as the segmented video data Dp of which the first score Sc1 is equal to or higher than the second threshold value Th12 and the slow motion video SL (step S34). For instance, the digest candidate generation unit 18 regards all slow motion videos SL generated in step S33 as the second candidate video data Cd2, and generates the digest candidate Cd. In this case, the information processing device 1 may not include the second candidate selection unit 17 that refers to the second inference section information D2. In another example, the digest candidate generation unit 18 generates the digest candidate Cd based on the second candidate video data Cd2 which are selected by the second candidate selection unit 17 using the second scoring Sc2.

According to the example embodiment in FIG. 8, by providing the first threshold value Th11 and the second threshold value Th12, it is possible for the information processing device 1 to generate the slow motion video SL with respect to a set of the segmented video data Dp in which the first score Sc1 is higher among sets of the segmented video data Dp to be included in the digest candidate Cd. Therefore, it is possible for the information processing device 1 to preferably include the slow motion video for a scene of a particularly high degree of importance in the digest candidate Cd.

Second Example Embodiment

Figure 9:
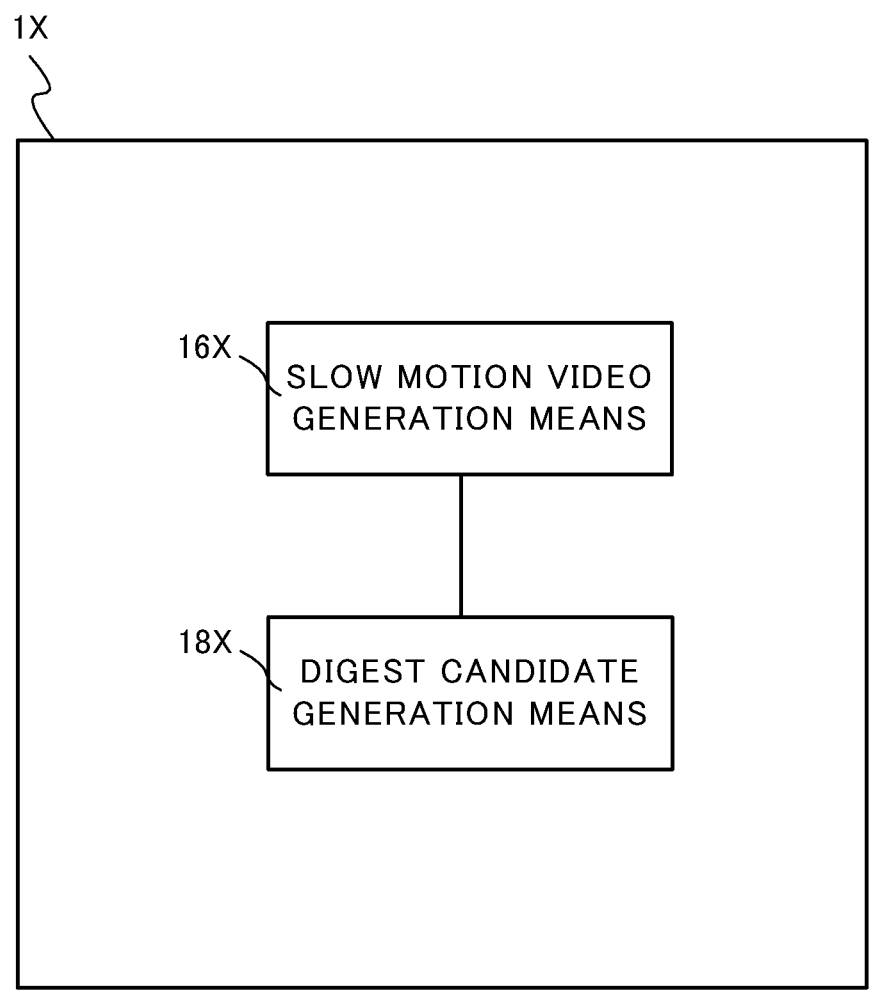
FIG. 9 is a functional block diagram of an information processing device in a second example embodiment.

FIG. 9 is a functional block diagram of an information processing device 1X according to a second example embodiment. The information processing device 1X mainly includes a slow motion video generation means 16X and a digest candidate generation means 18X.

For first candidate video data "Cd1" being video data that correspond to a segment of a portion selected from video material data "Dm", the slow motion video generation means 16X generates a slow motion video "SL" being video data in which a playback speed of the first candidate video data Cd1 is slower than the normal speed. Here, the slow motion video generation means 16X may be regarded as the slow motion video generation unit 16 in the first example embodiment (including modifications, hereinafter the same). The selection of the first candidate video data Cd1 may be performed by the information processing device 1X or may be performed by an external device other than the information processing device 1X. In a latter case, the external device may transmit information concerning the first candidate video data Cd1 to the information processing device 1X, and may additionally provide a label of a selection result of the first candidate video data Cd1 to the video material data Dm.

The digest candidate generation means 18X generates a digest candidate "Cd" which is a candidate for a digest of the video material data Dm, based on the video material data Dm and the slow motion video SL. Here, the digest candidate generation means 18X may be the digest candidate generation unit 18 of the first example embodiment. For instance, the digest candidate generation means 18X generates a digest candidate Cd regarded as one set of video data connecting the video data selected from the video material data Dm with the slow motion video SL. In this case, the "video data selected from the video material data Dm" may be the first candidate video data Cd1, or may be video data (for instance, the third candidate video data Cd3 in Modification 4 described above) selected by a selection method different from the method for the first candidate video data Cd1. In another example embodiment, the digest candidate generation means 18X may generate a list of the video data selected from the video material data Dm and the slow motion video SL as the digest candidate Cd.

Figure 10:
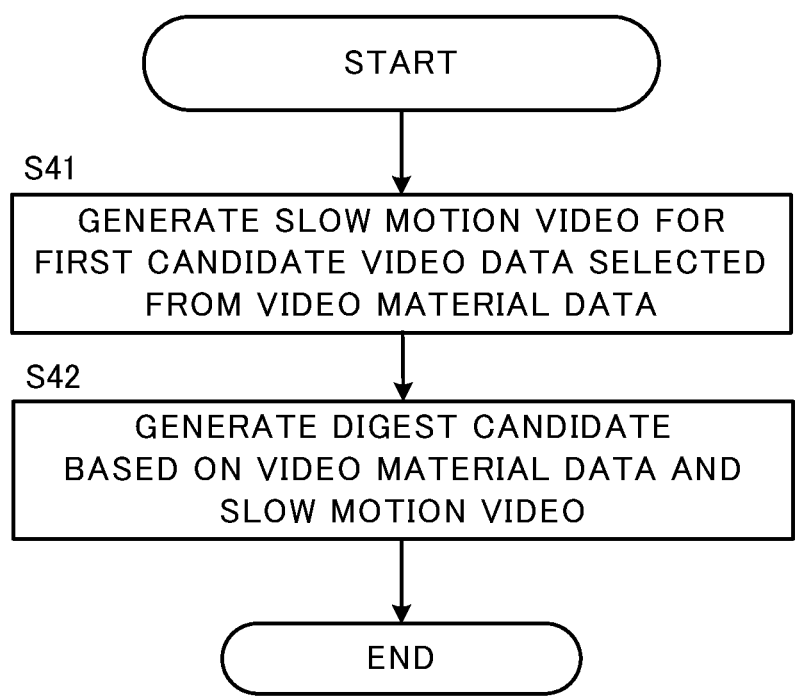
FIG. 10 illustrates an example of a flowchart of a process executed by the information processing device in the second example embodiment.

FIG. 10 is an example of a flowchart for a process executed by the information processing device 1X in the second example embodiment. First, the slow motion video generation means 16X generates the slow motion video SL in which the playback speed of the first candidate video data Cd1 is set to be slower than the normal speed, with respect to the first candidate video data Cd1 selected from the video material data Dm (step S41). The digest candidate generation means 18X generates the digest candidate Cd regarded as a candidate of the digest for the video material data Dm based on the video material data Dm and the slow motion video SL (step S42).

The information processing device 1X according to the second example embodiment can preferably generate a digest candidate including a slow motion video.

In the example embodiments described above, programs are stored using various types of non-transitory computer readable media (non-transitory computer readable media), and can be supplied to a computer such as a processor. The non-transitory computer-readable media include various types of tangible storage media (tangible storage media). Examples of non-transitory computer readable media include a magnetic storage medium (that is, a flexible disk, a magnetic tape, a hard disk drive), a magnetic optical storage medium (that is, a magnetic optical disk), a CD-ROM (Read Only Memory), a CD-R, a CD-R/W, a semiconductor memory (that is, a mask ROM, a PROM (Programmable ROM), an EPROM (Erasable PROM), a flash ROM, a RAM (Random Access Memory), and the like. Each program may also be provided to the computer by various types of transitory computer readable media (transitory computer readable media). In the examples of the transitory computer readable media, recording means include electrical signals, optical signals, and electromagnetic waves. The transitory computer readable media can provide the programs to the computer through wired channels such as wires and optical fibers, or wireless channels.

In addition, some or all of the above-described example embodiments may also be described as the following appendices, but are not limited thereto.

(Supplementary Note 1)

1. An information processing device comprising:
    a slow motion video generation means configured to generate each slow motion video being video data in which a playback speed of a first candidate video data is slower than a normal speed, with respect to the first candidate video data being video data which correspond to a segment of a portion selected from video material data; and
    a digest candidate generation means configured to generate a digest candidate being a candidate of a digest for the video material data based on the video material data and each slow motion video.

(Supplementary Note 2)

2. The information processing device according to supplementary note 1, wherein the slow motion video generation means generates slow motion videos respectively corresponding to a plurality of playback speeds for each set of the first candidate video data.

(Supplementary Note 3)

3. The information processing device according to supplementary note 1 or 2, further comprising a second candidate selection means configured to select second candidate video data from the slow motion videos based on scores respectively corresponding to the slow motion videos,
    wherein the digest candidate generation means generates the digest candidate based on the video material data and the second candidate video data.

(Supplementary Note 4)

4. The information processing device according to supplementary note 3, wherein the second candidate selection means selects each slow motion video of which a score is equal to or greater than a threshold as the second candidate data.

(Supplementary Note 5)

5. The information processing device according to supplementary note 3, wherein
    the slow motion video generation means generates the slow motion videos respectively corresponding to a plurality of playback speeds for each set of the first candidate video data; and
    the second candidate selection means selects, as the second candidate video data, each slow motion video of which a score is equal to or greater than a threshold and is highest among the slow motion videos for each set of the first candidate video data, in which the scores are calculated respectively for the slow motion videos.

(Supplementary Note 6)

6. The information processing device according to any one of supplementary notes 3 through 5, wherein the digest candidate generation means includes, in the digest candidate, only video data of which the score is highest among the first candidate video data corresponding to the same segment of the video material data and the second candidate video data.

(Supplementary Note 7)

7. The information processing device according to any one of supplementary notes 3 through 6, wherein the digest candidate generation means generates, as the digest candidate, video data combining the first candidate data and the second candidate data.

(Supplementary Note 8)

8. The information processing device according to any one of supplementary notes 3 through 7, further comprising a first candidate selection means configured to select the first candidate video data from the video material data based on a first inference section that is trained to infer each first score with respect to the video data being input,
    wherein the second candidate selection means calculates, as the score, second scores respectively corresponding to the slow motion videos based on a second inference section that is trained to infer each second score with respect to the vide data being input.

(Supplementary Note 9)

9. The information processing device according to supplementary note 8, wherein
    the first inference section is an inference section trained based on training video material data to which a label for an important segment or not is provided; and
    the second inference section is an inference section trained based on training video material data to which a label whether or not a particular event has occurred is provided.

Note that the "label for an important segment or not" may be a label indicating a degree of importance for each segment.

(Supplementary Note 10)

10. The information processing device according to supplementary note 8, wherein
    the first inference section and the second inference section are inference sections trained based on training video material data in which each segment is labeled as important or not; and
    the first score and the second score respectively indicate degrees of importance for corresponding video data.

Note that in this case, "the first inference section and the second inference section" are the same inference section or different inference sections.

(Supplementary Note 11)

11. The information processing device according to any one of supplementary notes 3 through 7, further comprising a first candidate selection means configured to select segmented video data to be the first candidate video data, by comparing a first score with respect to the segmented video data for each of segments of the video material data with a first threshold value, wherein the digest candidate generation means generates the digest candidate based on the segmented video data, which are selected by comparing the first score with a second threshold value different from the first threshold value, and the slow motion videos.

(Supplementary Note 12)

12. An information processing method performed by a computer, the information processing comprising:

generating each slow motion video being video data in which a playback speed of a first candidate video data is slower than a normal speed, with respect to the first candidate video data being video data which correspond to a segment of a portion selected from video material data; and generating a digest candidate being a candidate of a digest for the video material data based on the video material data and each slow motion video.

(Supplementary Note 13)

13. A recording medium storing a program, the program causing a computer to perform a process comprising:

generating each slow motion video being video data in which a playback speed of a first candidate video data is slower than a normal speed, with respect to the first candidate video data being video data which correspond to a segment of a portion selected from video material data; and generating a digest candidate being a candidate of a digest for the video material data based on the video material data and each slow motion video.

Although the present invention has been described with reference to the embodiments, the present invention is not limited to the above embodiments. Various changes that can be understood by those skilled in the art can be made to the configuration and details of the present invention within the scope of the present invention. That is, the present invention naturally includes various variations and modifications that a person skilled in the art can make according to the entire disclosure including the scope of claims and technical ideas. In addition, the disclosures of the cited patent documents and the like are incorporated herein by reference.

DESCRIPTION OF SYMBOLS 1, 1X Information processing device
2 Input device
3 Output device
4 Storage device
6 Learning device
100 Digest candidate selection system

The invention claimed is:

1. An information processing device comprising:
a memory storing instructions; and
one or more processors configured to execute the instructions to:
generate a plurality of slow motion videos in which a playback speed of a first candidate video data is slower than a normal speed, with respect to the first candidate video data corresponding to a segment of a portion selected from video material data;
select a second candidate video data from the slow motion videos based on scores respectively corresponding to the slow motion videos,
generate a digest candidate of a digest for the video material data based on the video material data and the second candidate video data.

2. The information processing device according to claim 1, wherein the processor generates the slow motion videos in respective correspondence to a plurality of the playback speeds for each of one or more sets of the first candidate video data.

3. The information processing device according to claim 1, wherein the processor selects each slow motion video of which the score is equal to or greater than a threshold, as the second candidate data.

4. The information processing device according to claim 1, wherein
the processor generates the slow motion videos in respective correspondence to a plurality of the playback speeds for each of one or more sets of the first candidate video data; and
the processor selects, as the second candidate video data, each slow motion video of which the score is equal to or greater than a threshold and is highest among the slow motion videos for each set of the first candidate video data.

5. The information processing device according to claim 1, wherein the processor includes, in the digest candidate, only video data of which the score is highest among the first candidate video data corresponding to a same segment of the video material data and the second candidate video data.

6. The information processing device according to claim 1, wherein the processor generates, as the digest candidate, video data combining the first candidate data and the second candidate data.

7. The information processing device according to claim 1, wherein the processor is further configured to select the first candidate video data from the video material data based on a first inference section that is trained to infer a first score with respect to input video data,
wherein the processor calculates, as the scores, second scores respectively corresponding to the slow motion videos based on a second inference section that is trained to infer a second score with respect to the input video data.

8. The information processing device according to claim 7, wherein
the first inference section is trained based on training video material data to which a label as to whether or not a segment is important is provided; and
the second inference section is trained based on training video material data to which a label as to whether or not a particular event has occurred is provided.

9. The information processing device according to claim 7, wherein
the first inference section and the second inference section are trained based on training video material data to which a label as to whether or not a segment is important is provided; and
the first score and the second score respectively indicate degrees of importance for corresponding video data.

10. The information processing device according to claim 1, wherein the processor is further configured to select segmented video data to be the first candidate video data, by comparing a first score with respect to the segmented video data for each of a plurality of the segments of the video material data with a first threshold value, wherein the processor generates the digest candidate based on the segmented video data selected by comparing the first score with a second threshold value different from the first threshold value, and the slow motion videos.

11. An information processing method performed by a computer and comprising:
   generating a plurality of slow motion videos in which a playback speed of a first candidate video data is slower than a normal speed, with respect to the first candidate video data corresponding to a segment of a portion selected from video material data;
   selecting a second candidate video data from the slow motion videos based on scores respectively corresponding to the slow motion videos,
   generating a digest candidate of a digest for the video material data based on the video material data and the second candidate video data.

12. A non-transitory computer-readable recording medium storing a program executable by a computer to perform processing comprising:
   generating a plurality of slow motion videos in which a playback speed of a first candidate video data is slower than a normal speed, with respect to the first candidate video data corresponding to a segment of a portion selected from video material data;
   selecting a second candidate video data from the slow motion videos based on scores respectively corresponding to the slow motion videos,
   generating a digest candidate of a digest for the video material data based on the video material data and the second candidate video data.

* * * * *